(12) United States Patent  
Silberstein et al.

(10) Patent No.: US 9,280,546 B2
(45) Date of Patent: Mar. 8, 2016

(54) SYSTEM AND METHOD FOR ACCESSING DIGITAL CONTENT USING A LOCATION-INDEPENDENT NAME

(71) Applicant: Palo Alto Research Center Incorporated, Palo Alto, CA (US)

(72) Inventors: Rebecca Lynn Braynard Silberstein, Sunnyvale, CA (US); Jose J. Garcia-Luna-Aceves, San Mateo, CA (US)

(73) Assignee: PALO ALTO RESEARCH CENTER INCORPORATED, Pal Alto, CA (US)

( * ) Notice: Subject to any disclaimer, the term of this patent is extended or adjusted under 35 U.S.C. 154(b) by 513 days.

(21) Appl. No.: 13/665,418

(22) Filed: Oct. 31, 2012

(65) Prior Publication Data
US 2014/0122737 A1    May 1, 2014

(51) Int. Cl.
G06F 15/16    (2006.01)
G06F 17/30    (2006.01)
G06Q 10/10    (2012.01)
H04L 29/06    (2006.01)

(52) U.S. Cl.
CPC .... *G06F 17/30041* (2013.01); *G06F 17/30017* (2013.01); *G06Q 10/101* (2013.01); *H04L 65/4069* (2013.01)

(58) Field of Classification Search
CPC . H04L 65/4065–65/4092; G06F 21/10–21/16; G06F 17/30861–17/30887; G06F 17/30017–17/3002; G06Q 20/1235
USPC ...................... 725/80–104; 709/217–219, 231
See application file for complete search history.

(56) References Cited

U.S. PATENT DOCUMENTS

| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Fall, K. et al., "DTN: an architectural retrospective", Selected areas in communications, IEEE Journal on, vol. 28, No. 5, Jun. 1, 2008, pp. 828-835.

(Continued)

*Primary Examiner* — David Lazaro
*Assistant Examiner* — Julian Chang
(74) *Attorney, Agent, or Firm* — Shun Yao; Park, Vaughan, Fleming & Dowler LLP

(57) ABSTRACT

A content-presenting system present digital content for a local user, and facilitates sharing a presentation state for digital content with remote devices. During operation, the system can detect a presentation-controlling event, which alters the presentation of the digital content at the content-presenting device. In response to detecting the presentation-controlling event, the system generates content-control information for the digital content. This content-control information can include a location-independent structured name associated with the digital content, and includes a presentation state for the digital content.

22 Claims, 10 Drawing Sheets

(56) References Cited

U.S. PATENT DOCUMENTS

| | | | |
|---|---|---|---|
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 * | 1/2010 | Feng ............................. 713/193 |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,862,774 B2 | 10/2014 | Vasseur |
| 8,937,865 B1 | 1/2015 | Kumar |
| 9,071,498 B2 | 6/2015 | Beser |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 * | 3/2003 | Eytchison et al. ............ 709/250 |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 * | 7/2005 | Hayes et al. .................... 700/19 |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 * | 11/2005 | Nonaka et al. ................. 709/217 |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 * | 6/2006 | Watanabe et al. ................. 707/1 |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |

(56) References Cited

U.S. PATENT DOCUMENTS

| | | | |
|---|---|---|---|
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0101357 A1 | 5/2008 | Iovanna | |
| 2008/0107034 A1 | 5/2008 | Jetcheva | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0256359 A1 | 10/2008 | Kahn | |
| 2008/0270618 A1 | 10/2008 | Rosenberg | |
| 2008/0287142 A1 | 11/2008 | Keighran | |
| 2008/0288580 A1 | 11/2008 | Wang | |
| 2008/0320148 A1 | 12/2008 | Capuozzo | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |
| 2009/0052660 A1 | 2/2009 | Chen | |
| 2009/0067429 A1 | 3/2009 | Nagai | |
| 2009/0077184 A1 | 3/2009 | Brewer | |
| 2009/0092043 A1 | 4/2009 | Lapuh | |
| 2009/0097631 A1 | 4/2009 | Gisby | |
| 2009/0103515 A1 | 4/2009 | Pointer | |
| 2009/0113068 A1* | 4/2009 | Fujihira et al. | 709/231 |
| 2009/0144300 A1 | 6/2009 | Chatley | |
| 2009/0157887 A1 | 6/2009 | Froment | |
| 2009/0185745 A1* | 7/2009 | Momosaki | 382/190 |
| 2009/0193101 A1* | 7/2009 | Munetsugu et al. | 709/219 |
| 2009/0222344 A1 | 9/2009 | Greene | |
| 2009/0228593 A1 | 9/2009 | Takeda | |
| 2009/0254572 A1 | 10/2009 | Redlich | |
| 2009/0268905 A1* | 10/2009 | Matsushima et al. | 380/200 |
| 2009/0285209 A1 | 11/2009 | Stewart | |
| 2009/0287835 A1* | 11/2009 | Jacobson | 709/229 |
| 2009/0288163 A1* | 11/2009 | Jacobson et al. | 726/22 |
| 2009/0300079 A1 | 12/2009 | Shitomi | |
| 2009/0300407 A1 | 12/2009 | Kamath | |
| 2009/0307333 A1 | 12/2009 | Welingkar | |
| 2009/0323632 A1 | 12/2009 | Nix | |
| 2010/0005061 A1 | 1/2010 | Basco | |
| 2010/0027539 A1 | 2/2010 | Beverly | |
| 2010/0046546 A1 | 2/2010 | Ram | |
| 2010/0057929 A1 | 3/2010 | Merat | |
| 2010/0088370 A1 | 4/2010 | Wu | |
| 2010/0098093 A1 | 4/2010 | Ejzak | |
| 2010/0100465 A1 | 4/2010 | Cooke | |
| 2010/0103870 A1 | 4/2010 | Garcia-Luna-Aceves | |
| 2010/0124191 A1 | 5/2010 | Vos | |
| 2010/0131660 A1 | 5/2010 | Dec | |
| 2010/0150155 A1 | 6/2010 | Napierala | |
| 2010/0165976 A1 | 7/2010 | Khan | |
| 2010/0169478 A1 | 7/2010 | Saha | |
| 2010/0169503 A1 | 7/2010 | Kollmansberger | |
| 2010/0180332 A1 | 7/2010 | Ben-Yochanan | |
| 2010/0182995 A1 | 7/2010 | Hwang | |
| 2010/0185753 A1 | 7/2010 | Liu | |
| 2010/0195653 A1 | 8/2010 | Jacobson | |
| 2010/0195654 A1* | 8/2010 | Jacobson et al. | 370/392 |
| 2010/0195655 A1* | 8/2010 | Jacobson et al. | 370/392 |
| 2010/0217874 A1 | 8/2010 | Anantharaman | |
| 2010/0232402 A1 | 9/2010 | Przybysz | |
| 2010/0232439 A1 | 9/2010 | Dham | |
| 2010/0235516 A1 | 9/2010 | Nakamura | |
| 2010/0246549 A1 | 9/2010 | Zhang | |
| 2010/0250497 A1 | 9/2010 | Redlich | |
| 2010/0250939 A1 | 9/2010 | Adams | |
| 2010/0268782 A1 | 10/2010 | Zombek | |
| 2010/0272107 A1 | 10/2010 | Papp | |
| 2010/0284309 A1 | 11/2010 | Allan | |
| 2010/0284404 A1 | 11/2010 | Gopinath | |
| 2010/0293293 A1 | 11/2010 | Beser | |
| 2010/0322249 A1 | 12/2010 | Thathapudi | |
| 2011/0013637 A1 | 1/2011 | Xue | |
| 2011/0022812 A1 | 1/2011 | vanderLinden | |
| 2011/0055392 A1 | 3/2011 | Shen | |
| 2011/0055921 A1 | 3/2011 | Narayanaswamy | |
| 2011/0090908 A1 | 4/2011 | Jacobson | |
| 2011/0106755 A1 | 5/2011 | Hao | |
| 2011/0145597 A1* | 6/2011 | Yamaguchi et al. | 713/189 |
| 2011/0145858 A1 | 6/2011 | Philpott | |
| 2011/0153840 A1 | 6/2011 | Narayana | |
| 2011/0161408 A1 | 6/2011 | Kim | |
| 2011/0202609 A1 | 8/2011 | Chaturvedi | |
| 2011/0231578 A1 | 9/2011 | Nagappan | |
| 2011/0239256 A1 | 9/2011 | Gholmieh | |
| 2011/0258049 A1 | 10/2011 | Ramer | |
| 2011/0264824 A1 | 10/2011 | Venkata Subramanian | |
| 2011/0265174 A1* | 10/2011 | Thornton et al. | 726/15 |
| 2011/0271007 A1* | 11/2011 | Wang et al. | 709/238 |
| 2011/0286457 A1 | 11/2011 | Ee | |
| 2011/0286459 A1 | 11/2011 | Rembarz | |
| 2011/0299454 A1 | 12/2011 | Krishnaswamy | |
| 2012/0011551 A1* | 1/2012 | Levy et al. | 725/82 |
| 2012/0036180 A1 | 2/2012 | Thornton | |
| 2012/0066727 A1* | 3/2012 | Nozoe et al. | 725/88 |
| 2012/0106339 A1 | 5/2012 | Mishra | |
| 2012/0114313 A1* | 5/2012 | Phillips et al. | 386/298 |
| 2012/0120803 A1 | 5/2012 | Farkas | |
| 2012/0136936 A1 | 5/2012 | Quintuna | |
| 2012/0136945 A1* | 5/2012 | Lee et al. | 709/206 |
| 2012/0141093 A1* | 6/2012 | Yamaguchi et al. | 386/259 |
| 2012/0155464 A1 | 6/2012 | Kim | |
| 2012/0158973 A1* | 6/2012 | Jacobson et al. | 709/227 |
| 2012/0163373 A1 | 6/2012 | Lo | |
| 2012/0179653 A1 | 7/2012 | Araki | |
| 2012/0197690 A1 | 8/2012 | Agulnek | |
| 2012/0198048 A1 | 8/2012 | Ioffe | |
| 2012/0221150 A1 | 8/2012 | Arensmeier | |
| 2012/0224487 A1 | 9/2012 | Hui | |
| 2012/0257500 A1 | 10/2012 | Lynch | |
| 2012/0290669 A1* | 11/2012 | Parks et al. | 709/206 |
| 2012/0290919 A1 | 11/2012 | Melnyk | |
| 2012/0291102 A1 | 11/2012 | Cohen | |
| 2012/0314580 A1 | 12/2012 | Hong | |
| 2012/0317307 A1 | 12/2012 | Ravindran | |
| 2012/0331112 A1* | 12/2012 | Chatani | 709/219 |
| 2013/0041982 A1 | 2/2013 | Shi | |
| 2013/0051392 A1 | 2/2013 | Filsfils | |
| 2013/0060962 A1* | 3/2013 | Wang et al. | 709/238 |
| 2013/0073552 A1 | 3/2013 | Rangwala | |
| 2013/0074155 A1 | 3/2013 | Huh | |
| 2013/0110987 A1 | 5/2013 | Kim | |
| 2013/0111063 A1* | 5/2013 | Lee | 709/241 |
| 2013/0151584 A1 | 6/2013 | Westphal | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0185753 A1* | 7/2013 | Choi et al. | 709/223 |
| 2013/0197698 A1 | 8/2013 | Shah | |
| 2013/0219038 A1 | 8/2013 | Lee | |
| 2013/0219081 A1 | 8/2013 | Qian | |
| 2013/0219478 A1 | 8/2013 | Mahamuni | |
| 2013/0223237 A1 | 8/2013 | Hui | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0282854 A1 | 10/2013 | Jang | |
| 2013/0282860 A1* | 10/2013 | Zhang et al. | 709/217 |
| 2013/0282920 A1 | 10/2013 | Zhang | |
| 2013/0304937 A1 | 11/2013 | Lee | |
| 2013/0329696 A1* | 12/2013 | Xu et al. | 370/331 |
| 2013/0336323 A1 | 12/2013 | Srinivasan | |
| 2013/0343408 A1 | 12/2013 | Cook | |
| 2014/0003232 A1 | 1/2014 | Guichard | |
| 2014/0006565 A1 | 1/2014 | Muscariello | |

(56) References Cited

U.S. PATENT DOCUMENTS

| | | | |
|---|---|---|---|
| 2014/0029445 A1 | 1/2014 | Hui | |
| 2014/0032714 A1 | 1/2014 | Liu | |
| 2014/0040505 A1 | 2/2014 | Barton | |
| 2014/0074730 A1 | 3/2014 | Arensmeier | |
| 2014/0082135 A1* | 3/2014 | Jung et al. | 709/217 |
| 2014/0089454 A1 | 3/2014 | Jeon | |
| 2014/0129736 A1* | 5/2014 | Yu | 709/242 |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0156396 A1 | 6/2014 | deKozan | |
| 2014/0172981 A1 | 6/2014 | Kim | |
| 2014/0173034 A1* | 6/2014 | Liu et al. | 709/217 |
| 2014/0192717 A1 | 7/2014 | Liu | |
| 2014/0195328 A1 | 7/2014 | Ferens | |
| 2014/0195666 A1 | 7/2014 | Dumitriu | |
| 2014/0233575 A1 | 8/2014 | Xie | |
| 2014/0237085 A1* | 8/2014 | Park et al. | 709/219 |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0314093 A1 | 10/2014 | You | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0063802 A1 | 3/2015 | Bahadur | |
| 2015/0095481 A1 | 4/2015 | Ohnishi | |
| 2015/0095514 A1 | 4/2015 | Yu | |

FOREIGN PATENT DOCUMENTS

| | | |
|---|---|---|
| EP | 0295727 A2 | 12/1988 |
| EP | 1077422 A2 | 2/2001 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOMM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {2013, Aug.). Less pain, most of the gain: Incrementally deployable ICN. In ACM SIGCOMM Computer Communication Review (vol. 43, No. 4, pp. 147-158). ACM.

(56) References Cited

OTHER PUBLICATIONS

G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.

(56) References Cited

OTHER PUBLICATIONS

NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOMM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube: An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOMM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
J. Lotspiech, S. Nusser, and F. Pestoni. Anonymous Trust: Digital Rights Management using Broadcast Encryption. Proceedings of the IEEE 92.6 (2004).
RTMP (2009). Available online at http://wwwimages.adobe.com/ www.adobe.com/content/dam/Adobe/en/devnet/rtmp/ pdf/rtmp specification 1.0.pdf.
S. Kamara and K. Lauter. Cryptographic Cloud Storage. Financial Cryptography and Data Security. Springer Berlin Heidelberg (2010).
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
D. Trossen and G. Parisis, "Designing and realizing and information-centric Internet," IEEE Communications Magazing, vol. 50, No. 7, pp. 60-67, Jul. 2012.

(56) References Cited

OTHER PUBLICATIONS

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hogue et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

\* cited by examiner

SYSTEM AND METHOD FOR ACCESSING DIGITAL CONTENT USING A LOCATION-INDEPENDENT NAME

BACKGROUND

1. Field

This disclosure is generally related to discovering and accessing media from one or more devices in a network and streaming this digital content to a target device or set of devices. More specifically, this disclosure is related to using a location-independent structured name to access digital content, user and device profiles, system control information and presentation state for presenting the digital content to a user.

2. Related Art

Advantages in mobile computing are making it possible for people to experience digital content from anywhere. Users can store movies, music, and pictures in their mobile devices so that they can enjoy their favorite media during brief moments of relaxation during their busy schedule. These advances in mobile computing are also increasing the quality of content that can be reproduced by these mobile devices and greatly increases the number of devices that can generate, capture and store digital content. Nowadays, even small mobile devices such as smartphones can produce full high-definition video with high-quality color reproduction, which causes users to prefer pre-loading full-definition content onto their devices, at the cost of storage space.

Unfortunately, storing high-definition video consumes a large portion of a mobile device's storage space, so that only a few movie files can be stored at a time. To avoid having to store movies locally on the portable device, some users subscribe to online streaming services such as Netflix, Pandora, etc. With these services, a user's portable device can access digital content from a collection of movies or music provided by the streaming service. While these services provide a large collection of content for their users to experience, these services do not always provide the content that the user wants to experience when the user wants to experience it. For example, a subscription-based movie-streaming service may not always have recently released movies in their inventory, which can cause the user to pay to rent these movies from an À la carte movie-streaming service. Thus, it is still oftentimes necessary for a user to pre-load his favorite movies from his personal movie collection into his portable device. Additionally, many devices are used to create user content (e.g., family outing videos and pictures of social events). However, these devices do not allow the user to stream content to one or more other devices on-demand, without having to locate and/or replicate the content on all of their devices.

While at home, some users access their digital media from a large storage device, such as a desktop computer or a local media server. Oftentimes, these storage devices are certified by the Digital Living Network Alliance (DLNA), which ensures that the storage device can interoperate with DLNA-certified client devices to stream digital media. However, in order for DLNA-certified components to discover and transmit configuration information to each other, these devices need to be connected to a common local area network (LAN).

If a user desires to obtain digital content from his home DLNA network while away from home, the user has to perform the tedious task of configuring a virtual-private network (VPN) to his at-home LAN as a way to access an at-home DLNA-certified media server. Unfortunately, not many users know how to make such a network configuration. And for those that do, these users have to keep track of the network address for their at-home LAN, given that residential internet service providers tend to issue dynamic network addresses that can change at any time. If the network address changes for the user's home internet service, the user will no longer be able to access content from his at-home media server. Alternatively, users can also use third party infrastructure with a user-defined account to upload content explicitly. This requires users to duplicate storage systems and infrastructure, and places a higher burden on the user to remember which service was used to store specific content and how to access it.

SUMMARY

One embodiment provides a content-presenting system that presents digital content for a local user, and facilitates sharing a presentation state for digital content with remote devices. During operation, the system can detect a presentation-controlling event, which alters the presentation of the digital content at the content-presenting device. In response to detecting the presentation-controlling event, the system can generate content-control information for the digital content. This content-control information is useful to any device in a network, such that the information is not defined for existing endpoints of a network connection.

Further, this content-control information can be created and used by multiple devices in the network. The creation and use is not limited to devices with a defined functionality, such as a server or a controller. The information can include state, control, and content information that can be distributed fully to the participating devices in the network. This content-control information can include a location-independent structured name associated with the digital content, and includes a presentation state for the digital content.

The content-control information can be communicated through a location-independent connectivity (network) architecture, such as Content Centric Networking (CCN). Devices in the network can disseminate or request the content-control information and the corresponding content through the network via the location-independent name. In CCN, this is done through the use of the Interest-Data protocol. The location-independent names are used to construct Interests that are expressed to retrieve, at most, one matching object (packet).

In some embodiments, the system can detect the presentation-controlling event in response to determining that the local user has left a proximity of the content-presenting device, or in response to detecting that the local user has paused, stopped, or otherwise modified the presentation of the digital content. Further, the system can detect the presentation-controlling event in response to determining that the user has initiated a presentation of a different piece of digital content at the local content-presenting device, or at a remote content-presenting device. Additionally, the system can detect an interrupting event, such as a calendar entry or a telephone call.

In some embodiments, while generating the content-control information, the system determines one or more content attributes associated with the digital content, and determines one or more presentation conditions for a remote content-presenting device. The system generates a presentation policy for the digital content based on the content attributes and the presentation conditions, wherein the presentation policy indicates one or more conditions for presenting the digital content at a target content-presenting device, and generates the content-control information to include the presentation policy. The system then generates a location-independent structured name for the content-control information based on the content attributes, and assigns the location-independent structured name to a defined content unit (e.g., in CCN, this location-independent name is used to identify content objects).

In some embodiments, the content attributes include one or more of: a file name; a file type; a presentation state; a media format; a content category; a content rating; a file-creation date; and a content-publication date.

In some embodiments, the presentation conditions include one or more of: a user identifier; a group identifier; a time range; a date range; a location; a presentation-device identifier; and a user-interface capability.

One embodiment provides a content-presenting system that can obtain a presentation state from a remote device for certain digital content, and can present the digital content for a local user. During operation, the system can determine that a local user desires to experience digital content, and obtains content-control information for a piece of digital content. The content-control information can include a location-independent structured name associated with a piece of digital content, and can include a presentation state for the digital content. The content-control information can also include other relevant information, for example, details on the content itself, configuration information, a device profile, and/or a user preference profile. The system then obtains the digital content based on the location-independent structured name, and presents the digital content to the local user based on the presentation state.

In some variations on these embodiments, the system can use the content-control information to obtain a collection of information, such as content available at a current time from one or more devices accessible via the network (with mobile devices and changing network connectivity, some content may not be available at all times). The available content is not restricted to that of the stored content on a media hub or server that has a fixed location (e.g., a fixed network address). Rather, the available content can be identified from the collection of network devices accessible via the network. The collection of information can be contained in one or more underlying objects, which can be disseminated using location-independent names, as defined by the underlying architecture.

In some embodiments, the system can generate an interest for content-control information in response to detecting that the local user is likely to desire to experience digital content. The system can automatically determine that the local user desires to experience digital content in response to determining that the local user has entered a proximity of the content-presenting device, or that the local user has activated a content-presenting capability of the content-presenting device. The system can also determine that the local user desires to experience digital content in response to determining that the local user has terminated a presentation of digital content, or that the local user has selected the piece of digital content for presentation.

In some embodiments, while obtaining content-control information, the system generates one or more interests for the content-control information, and disseminates the interests via a content-centric network. Each interest indicates a location-independent structured name associated with content in the system namespace. These names are used to identify and transmit system information, such as presentation commands, content-control information, device-configuration information, and content. This data may be fragmented into one or more underlying objects (packets). Each interest will retrieve at most one object. Then, the system obtains one or more objects in response to disseminating the interests, such that the content-control information indicates at least a location-independent structured name for a corresponding piece of digital content and a presentation state for the corresponding piece of digital content, if one exists. The location-independent name can then be used to stream the referenced content. For example, a device may issue interests to retrieve the user's display preferences and listing of available movies. The user can then use this returned information to select a movie and stream it onto the device. This content, including the profile and availability information, may come from one or more devices.

In some embodiments, while generating interests, the system can determine content-selection criteria for digital content to present at the content-presenting device, and generates location-independent structured names for the interests based on the content-selection criteria.

In some embodiments, while obtaining the content-control information, the system determines a presentation policy for a respective piece of content-control information, such that the presentation policy can indicate one or more conditions for presenting a piece of digital content associated with the respective content-control information. The system then determines whether the presentation policy is satisfied at the content-presenting device, and can configure the piece of digital content to be available to the local user in response to determining that the content-presenting device satisfies the presentation policy.

In some embodiments, the presentation policy includes one or more of the following conditions: a user identifier; a group identifier; a content category; a content rating; a file type; a media format; a time range; a date range; a location; a presentation-device identifier; and a user-interface capability.

In some embodiments, the system can receive one or more pieces of content-control information for one or more pieces of digital content to present to the user, and can present to the local user a content listing that indicates the one or more pieces of digital content. Then, in response to receiving a selection for a piece of digital content, the system can present the piece of digital content based on a presentation state from corresponding content-control information.

In some embodiments, while obtaining the digital content, the system generates interests for the digital content, such that the interest indicates the location-independent structured name associated with the digital content. The system then disseminates the interests via a location-independent architecture, such as a content-centric network, and obtains the piece of digital content to present to the local user in response to disseminating the interest. One or more interests may be used to retrieve the full content.

In some embodiments, the system generates or receives content objects that are encrypted.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

OVERVIEW

Embodiments of the present invention solve the problem of presenting digital content to a user via whichever computing device the user is operating. For example, the user may begin watching a movie or listening to an audio stream via a content-presenting system that streams digital content from a home device or from an online service. If the user stops the video or audio stream before the end of the stream, or leaves the vicinity of the content-presenting system before the end of the stream, the system can generate a piece of content-control information that other devices can use to resume the stream's presentation.

Then, as the user searches for digital content via a different content-presenting system, such as using a mobile device while on a train or a media device at a hotel, this content-presenting system can automatically discover which digital content may be of interest to the user by obtaining one or more pieces of content-control information associated with the user.

Figure 1A:
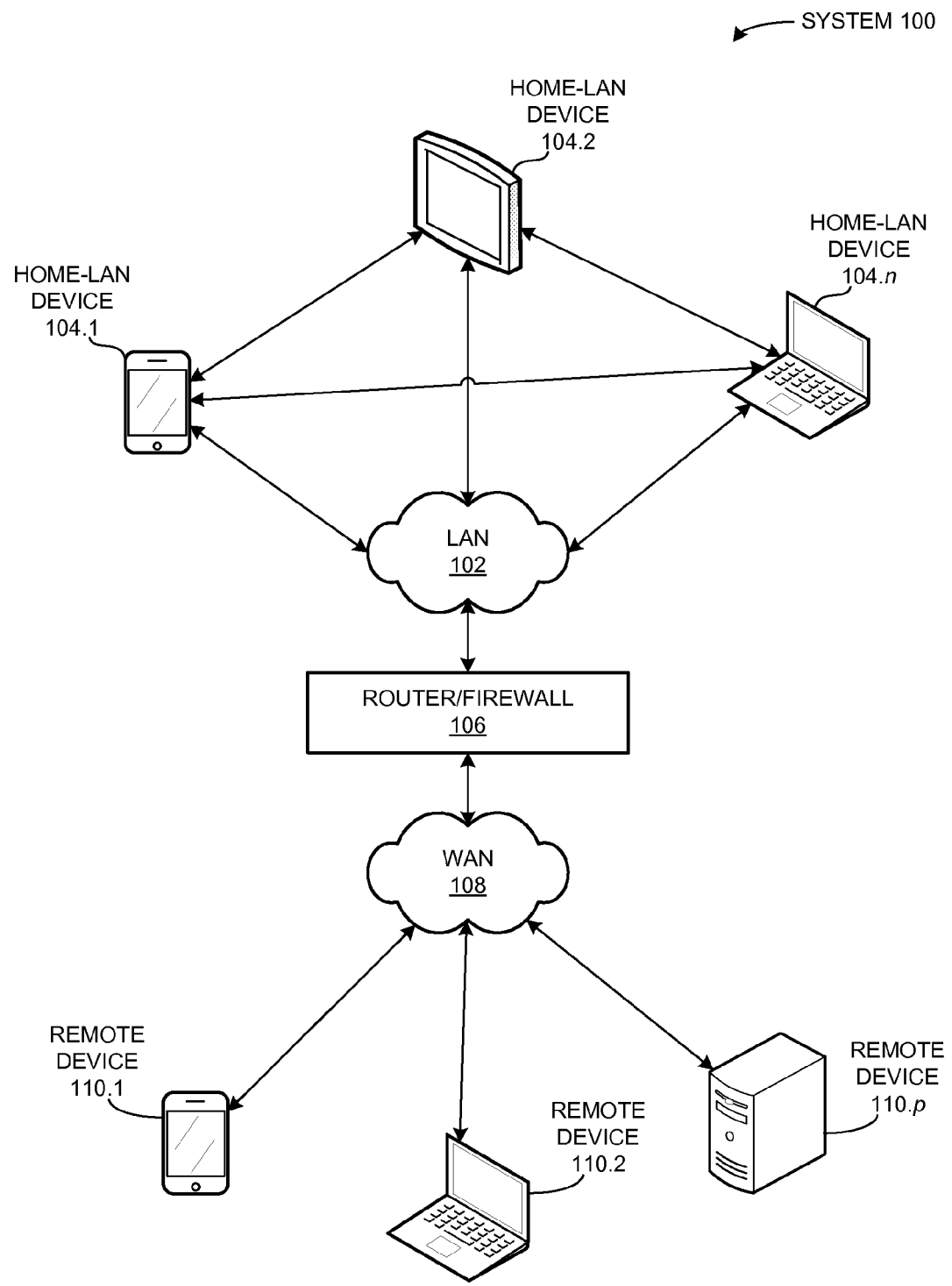
FIG. 1A illustrates an exemplary computer system that facilitates accessing digital content across various local and remote computing devices in accordance with an embodiment.

FIG. 1A illustrates an exemplary computer system that facilitates accessing digital content across various local and remote computing devices in accordance with an embodiment. A device 104 within a local area network (LAN) 102 can access content or content-control information from other devices 104 within LAN 102, or from other remote devices 110 that are accessible via a wide-area network (WAN) such as the Internet. Thus, the content and the content-control information can be distributed across various devices that are accessible via different computer networks.

LAN 102 can include any local area network, such as the user's home network behind a router 106, an office network behind router/firewall 106, a network behind a public wireless router/access-point 106 (e.g., within a train or a coffee shop). LAN 102 can also include direct peer-to-peer network connections, such as via a USB connection, a Bluetooth connection, or an ad-hoc Wi-Fi network connection. The devices behind LAN 102 can include a laptop 104.1, Internet-enabled television 104.2, or smartphone 104.n. Further, devices behind WAN 110 can include another user's smartphone or mobile computing device 110.1, a user or a company-owned computer 110.2, or a media server 110.p.

In some embodiments, the content-presenting system can disseminate and/or receive content-control information associated with the user via a content-centric network. For example, the system can obtain information that the user has requested by name (e.g., a movie or song title). The system then obtains information such as available content, control information (e.g., a presentation state), presentation preferences, device and user profiles, security policies, and identity information. To present digital content to the user, the system can obtain a unique location-independent structured name associated with the digital content from the content-control information, and can use this unique name to obtain the digital content from remote devices that store the desired digital content. The system can also obtain a presentation state for the digital content from the content-control information, and can use this presentation state to resume presenting the digital content for the user at a position that the user left off and with the same settings (e.g., a closed caption setting, a closed-caption language, an audio language, etc.).

The system can also use the content-control information to generate an interest for content suitable for the user. By disseminating the interest, the system can obtain content that has device and user preferences which match the preferences for the user and/or the user's device.

In some embodiments, the system can be used to automatically make content from a local Digital Living Network Alliance (DLNA) network available to the user while at a remote location, without having to configure a remote device to interact explicitly with the user's DLNA network. The system can also obtain content from a remote device to present to the user in the user's home or on another remote device. For example, the system can assign a location-independent structured name to digital content and/or to content-control information for the digital content, which allows any device with proper permissions to obtain and resume playback of the digital content from outside the DLNA network (e.g., outside a user's home local-area network). To obtain the digital content, for example, the remote device can generate an interest that includes the content's location-independent structured name. When the device disseminates the interest via a content-centric network, other devices that store the digital content can receive the interest and can respond by providing the digital content to the user's device.

Also, the user's device can obtain content-control information associated with the user by generating and disseminating an interest whose location-independent structured name indicates the user's unique identifier as well as a sub-domain associated with the content-control information (e.g., "/johndoe/media/control"). Then, any device that includes content-control information with this sub-domain can respond by providing this content-control information to the user's device.

In some embodiments, the system can convert DLNA commands into content-control information that is disseminated in lower level packets/objects that have a location-independent structured name, which allows any device with the proper permissions to obtain the data (and hence the DLNA commands) for the control information. These DLNA commands can indicate, for example, new digital content to add to the user's collection, digital content to remove from the user's collection, a new presentation state for a piece of digital content in the user's collection, etc.

In a content-centric network, a structured name can be divided into several hierarchical components. For example, in the name "/parc/home/ccn/test.mp4," the individual name components are parc, home, ccn, and test.mp4. Structured names also enable efficient routing for named content. A component-wise structure allows a hierarchical organization of names, and a logarithmic efficiency in accessing content by name. There is no single "root" for a naming scheme. However, the naming scheme can be modeled as a forest of trees. Names can be structured in various ways. For example, they can be structured in a left-oriented prefix-major fashion. Thus, the name "/parc/home/ccn" can be a "parent" of "/parc/home/ccn/test."

Name components can be binary strings and can be opaque to the underlying network. More generally, a semantic meaning to a name component is an agreement or convention between name producers and consumers. Names can also be text or in a form where low-level network nodes can understand the meaning of "special" name components. Further, a "file" is represented by a tree of content items under the file's name. For example, if various versions of the same file exist, these various versions can exist within the same prefix of the structured name.

In some embodiments, the semantic meaning of a name component can be defined by a rule that indicates which content items in a user's computer belong to a corresponding data collection or sub-collection. The rule can be implemented in higher-level libraries and services, and need not be part of the low-level network architecture. The rule can specify, for example, "all files under the '/media' namespace or directory of storage drive X," "all content items published by Adam," and/or any rule that generates a specific set of names given to a device's content store. The mappings between names and device-specific configurations are defined locally on each computing device. For a single deployment namespace, a mapping on a laptop may be to a local filesystem directory such as "/user/home/adam/media," and may be to a different directory on a different device (e.g., "/var/media/shared/"). Even though these local configuration mappings are different, the devices use the information and content they contain in the system as shared information. The key to this system is the mapping between higher-level information and location-independent names for control information, content and user activity and behavior.

In sum, the system generates a persistent structured name for a content item (e.g., for digital content or for a content-control object for the digital content), and associates this persistent structured name with the content item. Because of this naming convention, a content item can be addressed, located, retrieved, cached, and disseminated by its name. Additionally, the system can generate and disseminate names for accessing or retrieving content without first determining a name for the desired data or content. For example, the system can construct, generate or discover the name associated with a user's digital media and/or related control information. The system can obtain the content data that is associated with the structured name by publishing a data request that includes the structured name (e.g., a CCN interest), and can receive the content item from any device that has the content item whose structured name satisfies the request.

Figure 1B:
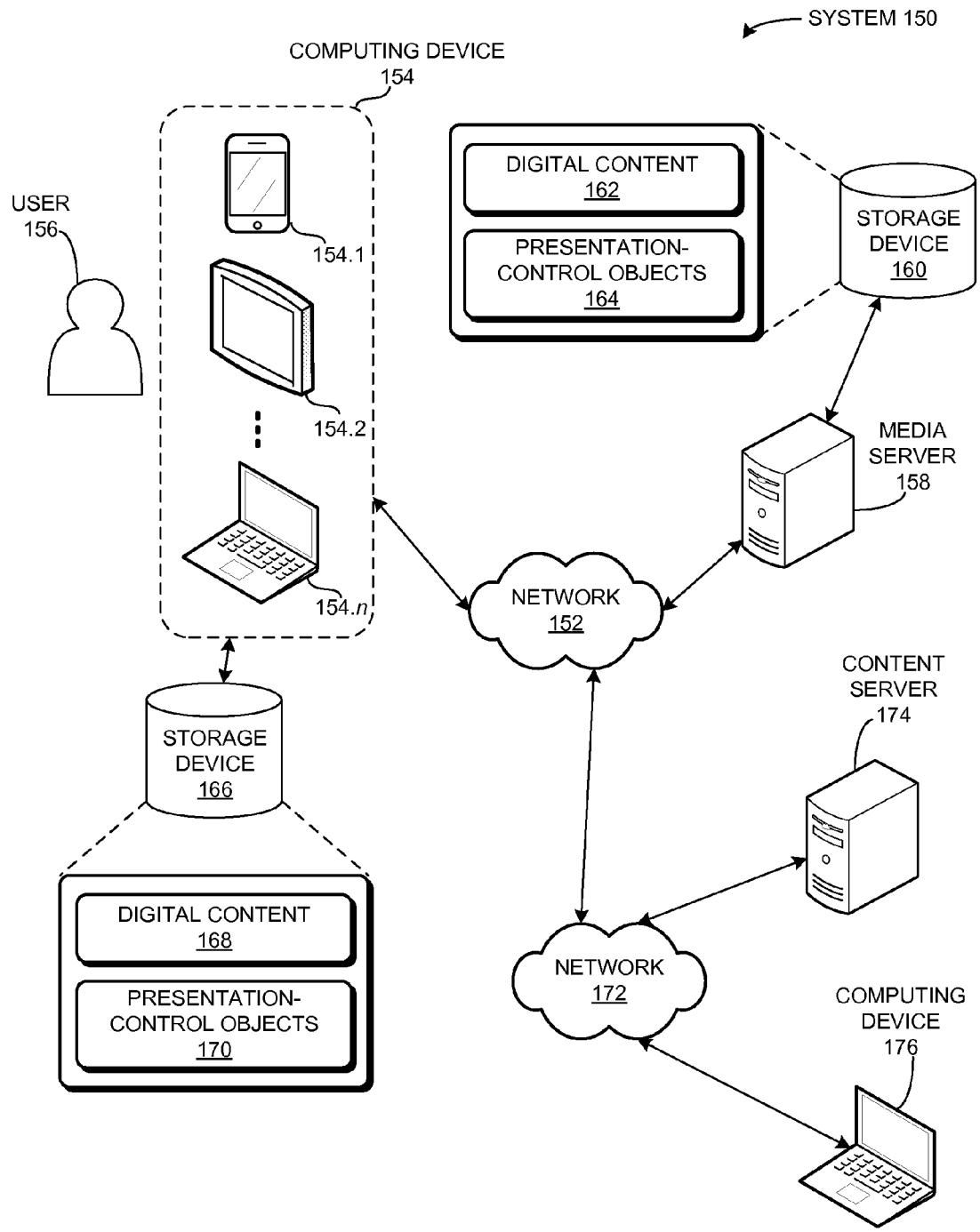
FIG. 1B illustrates an exemplary computer system that facilitates accessing digital content across devices in various computer networks in accordance with an embodiment.

FIG. 1B illustrates an exemplary computer system that facilitates accessing digital content across devices in various computer networks in accordance with an embodiment. System 150 can include a computing device 154 that can communicate with a media server 158 via a home network 152 (e.g., a local-area network). Computing devices 154 can include, for example, a tablet or smartphone 154.1, an internet-connected television 154.2, or any other personal computing device 154.n, (e.g., a desktop computer, a laptop, a multimedia or gaming device, etc.). As another example, media server 158 can include software running on computing device 154. In some embodiments, computing device 154 includes a storage device 166 that stores digital content 168, and can store presentation-control objects 170. Presentation-control objects 170, for example, can indicate a presentation state or configuration for digital content 168 or for digital content being streamed from a remote device (e.g., for digital content 162 accessible from media server 158).

Further, media server 158 can include any server that can be used to stream media to a client device, for example, using a DLNA network. Media server 158 may include a desktop or laptop computer or network-attached storage that includes or is coupled to a storage device 160, or can software running on a device such as a networked television, a cable box, a Blu-ray player, a digital video recorder (DVR), etc. Specifically, storage device 160 can store digital content 162 (e.g., movie, audio, and/or image files), and can store presentation-control objects (e.g., data that indicates a presentation state for a piece of digital content, user and device profiles, user preferences, etc.).

During operation, user 156 can activate a multimedia client on computing device 154, at which point computing device 154 can auto discover media server 158 within network 152, for example, using a DLNA-based discovery protocol. Then, as user 156 browses through the digital content available in the network hosted by media server 158 and/or other connected devices (both locally in the home and remote through the system), computing device 154 can detect the available digital content, for example, using a DLNA-based content-discovery protocol. In some embodiments, media server 158 can include software running on one or more computing devices. For example, media server 158 can include software running on a computer cluster, which is accessible by computing device 154, content server 174, and/or computing device 176 via one or more computer networks. Further, media server 158 can include software running on computing device 154, content server 174, and/or computing device 176, which facilitates sharing digital content between a plurality of computing devices via one or more computer networks.

User 156 can interact with computing device 154 to view or listen to certain digital content, or to navigate through a piece of digital content (e.g., by pausing, fast-forwarding, rewinding, stopping, jumping to a certain chapter, etc.). As user 156 navigates through the piece of digital content, computing device 154 can generate a DLNA command for the navigation operation, and communicates the DLNA command to media server 158. Computing device 154 can also communicate these commands and control information using location-independent structured names, which allows system 150 to operate in a fully distributed manner.

In some embodiments, computing device 154 and/or media server 158 can generate content-control information objects for DLNA commands, and can assign a location-independent structured name for the DLNA command. The content-control information can include the DLNA command itself, and/or can include the digital content's presentation state that results from executing the DLNA command. Any device within local area network 152 and/or a wide-area network 172 can obtain a content-control information object by disseminating a CCN interest for control information objects.

For example, if user 156 needs to stop watching or listening to a certain video or audio stream to commute to work, computing device 154 or media server 158 can generate a presentation-control object that includes the most recent presentation state for the user's media stream. Then, once user 156 has sat down on a train to commute to work, user 156 can interact with device 154 or a computing device 176 (e.g., a laptop or a smartphone) to resume watching or listening to the media stream via wide-area network 172 (e.g., a cellular network).

To resume playback of the media stream, computing device 176 can disseminate an interest for the digital content and the corresponding control information object(s) via a location-independent naming architecture for content and communication, such as via a content-centric network (e.g., networks 152 and 172). In some embodiments, computing device 176 can receive the presentation-control object(s) and the digital content from any device within home network 152 or wide-area network 172. For example, computing device 176 can receive the presentation-control object(s) for the media stream from computing device 154 or media server 158 within home network 152. Computing device 176 can analyze the presentation-control objects to determine the presentation state and a location-independent structured name for the digital content, and can disseminate an interest that includes the structured name for the digital content. After disseminating the interest, computing device 176 can receive the digital content from media server 158 of home network 152, or can receive the digital content from any other device that can satisfy the interest (e.g., a content server 174 accessible via wide-area network 172).

Figure 2A:
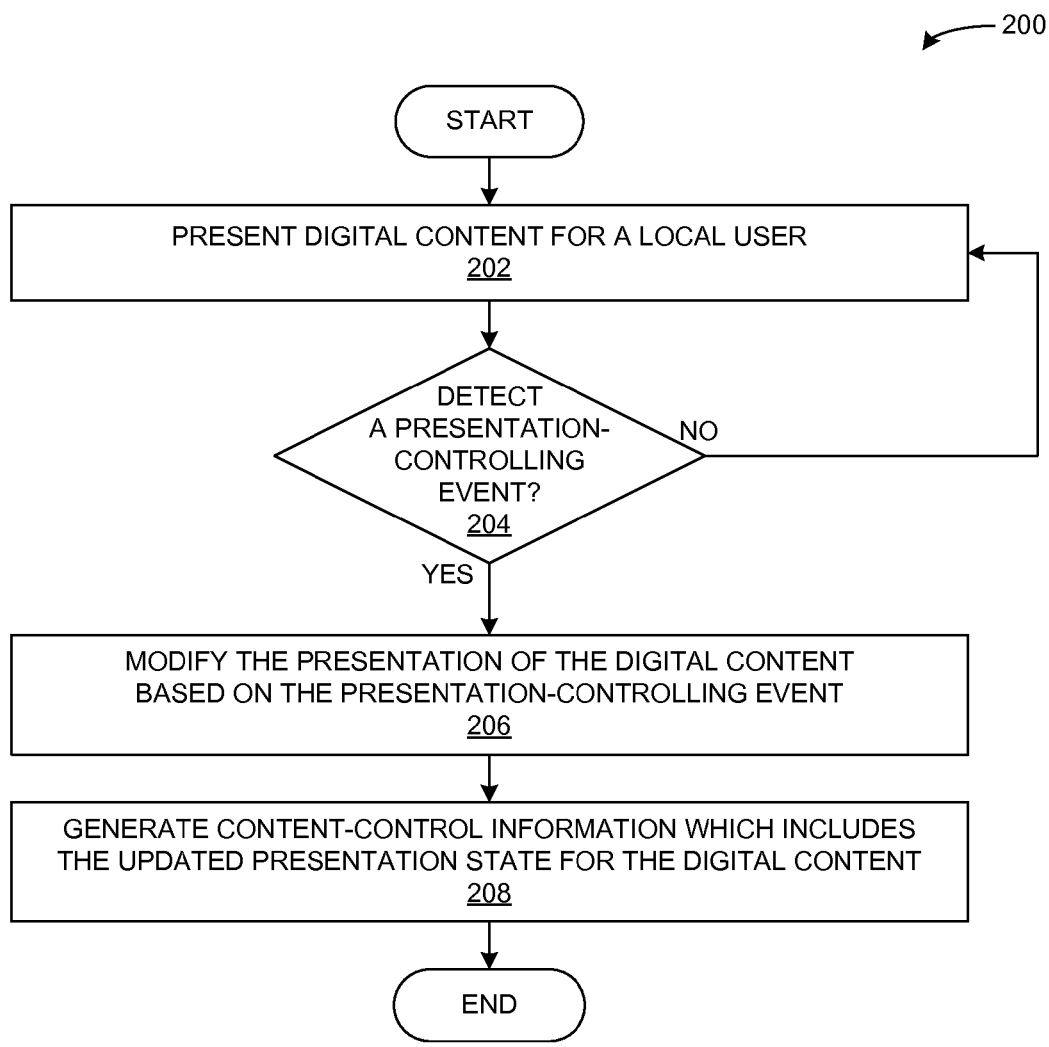
FIG. 2A presents a flow chart illustrating a method for generating content-control information in accordance with an embodiment.

FIG. 2A presents a flow chart illustrating a method for generating content-control information in accordance with an embodiment. During operation, the system can present digital content for a local user (operation 202). This digital content can include any content that can be obtained from a local storage device, or that can be downloaded or streamed from a remote device, and presented to the local user. For example, the user may watch a video stream, listen an audio stream, or view a slide show from a media server within his local area network (LAN).

At some point, the presentation of the digital content can change in a way that may require synchronizing the presentation's state with a remote computing device, such as with an internet-enabled television at a different room in the house, or a mobile device (e.g., a smartphone) that the user takes with him as he leaves the house. The system can determine whether it detects a presentation-controlling event (operation 204), such as any event where a remote device can benefit from having an updated presentation state for the digital content. For example, the presentation-controlling event can include any change in the presentation state of the digital content, such as when the system finishes presenting the digital content, or when the system receives a command from the user to alter the playback of the digital content (e.g., when the user pauses, stops, fast-forwards, or rewinds the presentation of the digital content). As another example, the presentation-controlling event can include any change in the user's attention to the digital content. These events can include the user leaving a proximity of the content-presenting device, or the user initiating a presentation of a different piece of digital content (e.g., receiving a phone call at the local device, or an event notification at a remote content-presentation device), which indicates that the user is no-longer paying attention to the initial piece of digital content.

If the system does not detect a presentation-controlling event (operation 204), the system returns to operation 202 to resume presenting the digital content. However, if the system does detect a presentation-controlling event, the system can modify the presentation of the digital content based on the presentation-controlling event (operation 206). The system then generates content-control information that includes the presentation state for the digital content (operation 208).

TABLE 1

| Presentation-Controlling Event | Outcome |
| --- | --- |
| User leaves vicinity of content-presenting device | Generate a content-control information object for the current state, and pause, stop, or resume the presentation |
| User pauses or stops the presentation of the digital content | Generate a content-control information object for the current state, and pause or stop the presentation |
| User fast-forwards the presentation of the digital content | Generate a content-control information object for the recent presentation state and fast-forward the presentation of the digital content to the target presentation state |
| User rewinds the presentation of the digital content | Generate a content-control information object for the recent presentation state and rewind the presentation of the digital content to the target presentation state |
| User initiates a presentation of a different piece of digital content at the local content-presenting device | Generate a content-control information object for the final presentation state of the previous digital content and initiate the presentation of the different piece of content |
| User views or reviews a collection of content, such as a playlist or slideshow | Generate content-control information to pre-fetch content to the device |
| User initiates a presentation of a different piece of digital content at a remote content-presenting device | Generate a content-control information object for the current presentation state of the digital content, and pause, stop, or resume the presentation at the local content-presenting device |

Table 1 presents exemplary responses to a set of presentation-controlling events in accordance with an embodiment. For example, if the system determines that the user leaves the vicinity of the content-presenting system while the system is presenting digital content for the user, the system can respond by generating a content-control information object for the current presentation state (e.g., the current timestamp for a video stream). The system can also either pause, stop, or resume the presentation of the digital content. This way, any other content-presenting system can use the content-control information object to resume playback of the digital content for the user at (or shortly before) the presentation timestamp for when the user left the room.

As another example, if the system determines that the user pauses, stops, fast-forwards, or rewinds the presentation, the system can generate the content-control information object for the recent presentation state (e.g., the last-played timestamp for the video stream before executing the user's command). The system then processes the user's command to alter the presentation (e.g., to pause, stop, fast-forward, or rewind the presentation, respectively).

Further, if the system determines that the user has initiated playback of another piece of digital content (e.g., at the local content-presenting system or a remote content-presenting system), the system can generate a content-control information object for the final presentation state of the previous digital content. If the user is watching the other piece of content locally, the system can resume to initiate the presentation of the other piece of content. If the user is watching the other piece of content on a remote device, the local content-presenting system can either pause, stop, or resume the presentation of the previous piece of digital content).

Figure 2B:
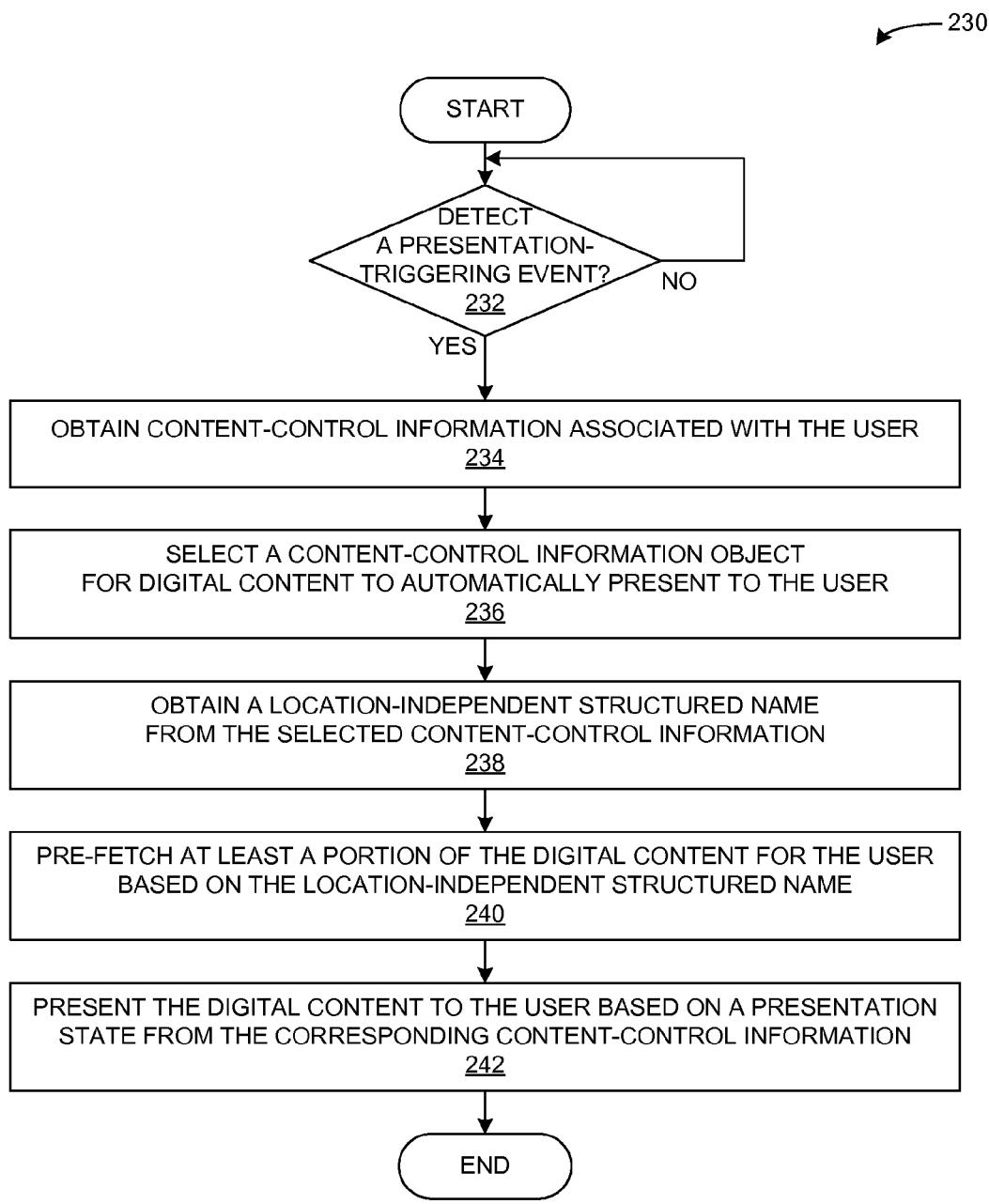
FIG. 2B presents a flow chart illustrating a method for presenting digital content to a user based on a presentation state from content-control information in accordance with an embodiment.

FIG. 2B presents a flow chart illustrating a method for presenting digital content to a user based on a presentation state from content-control information in accordance with an embodiment. During operation, the system can determine whether it detects a presentation-triggering event (operation 232), such as any event that can indicate to the local content-presenting system that the user may desire to experience digital content. For example, the presentation-triggering event can include the user activating a content-presenting capability of a content-presenting device (e.g., by launching an application to access a DLNA media server), the user entering a proximity of the content-presentation device (e.g., the user re-entering a room where he's watching a movie), and/or the user selecting a certain piece of digital content. As a further example, the presentation-triggering event can include the user terminating a presentation of digital content, which indicates that the user may be ready to view or listen to another video or audio stream.

If the system detects a presentation-triggering event, the system can proceed to obtain content-control information objects associated with the user (operation 234), and selects a content-control information object for digital content to automatically present to the user (operation 236). The system can obtain and select the content-control information object by using a content-centric network to disseminate an interest in content-control information objects associated with the user.

After selecting the content-control information object, the system obtains a location-independent structured name from the content-control information object (operation 238), and pre-fetches at least a portion of the digital content for the user based on the location-independent structured name (operation 240). The system then presents the digital content to the user based on a presentation state from the corresponding content-control information object (operation 242). The system can select a content-control information object for a piece of digital content that was recently interrupted, or for digital content that the user typically likes to experience during a given context (e.g., watching a recently-recorded broadcast of a given show or news program while on a lunch break).

Figure 2C:
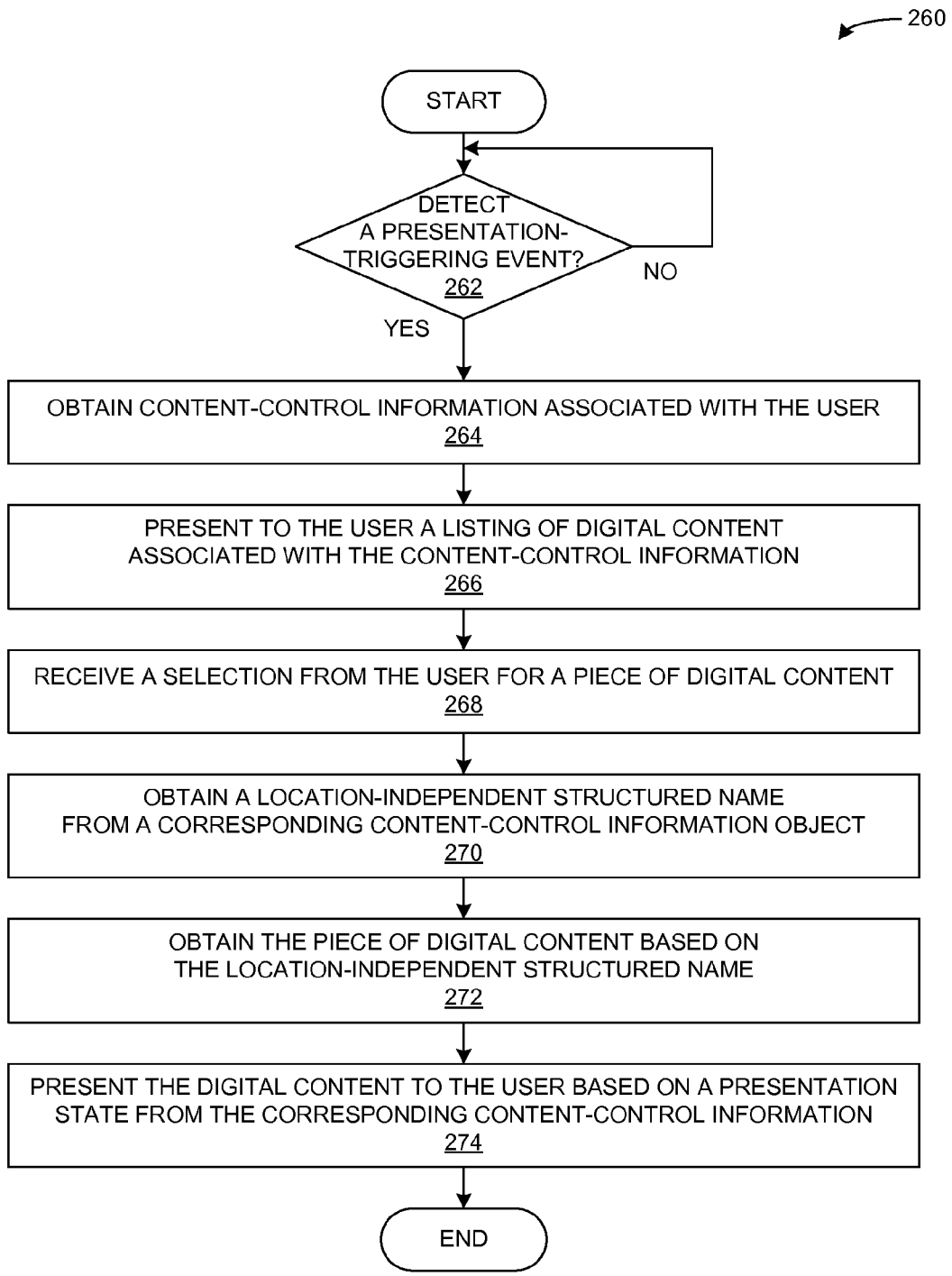
FIG. 2C presents a flow chart illustrating a method for presenting a listing of digital content for a user based on one or more content-control information objects associated with the user in accordance with an embodiment.

FIG. 2C presents a flow chart illustrating a method for presenting a listing of digital content for a user based on one or more content-control information objects associated with the user in accordance with an embodiment. During operation, the system can determine whether it detects a presentation-triggering event (operation 262), such as any event that can indicate to the local content-presenting system that the user may desire to experience digital content.

If the system detects a presentation-triggering event, the system can proceed to obtain content-control information objects associated with the user (operation 264), for example, by using a content-centric network to disseminate interests in content-control information objects associated with the user. The system can present to the user a listing of digital content associated with the content-control information objects (operation 266).

Once the system receives a selection from the user for a piece of digital content (operation 268), the system obtains a location-independent structured name from a corresponding content-control information object (operation 270). The system then obtains the piece of digital content based on the location-independent structured name (operation 272), and presents the digital content to the user based on a presentation state from the corresponding content-control information object (operation 274).

Figure 3:
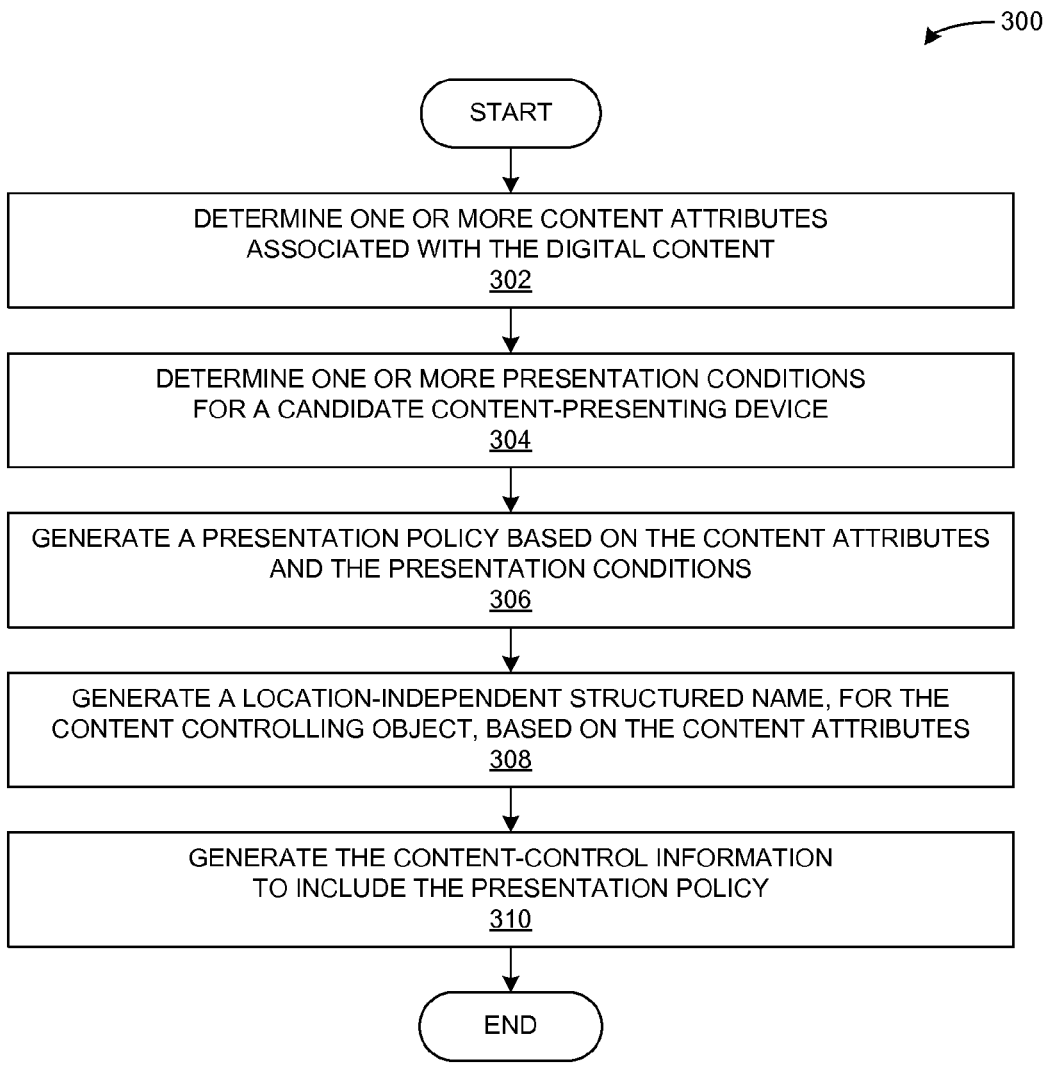
FIG. 3 presents a flow chart illustrating a method for generating content-control information in accordance with an embodiment.

FIG. 3 presents a flow chart illustrating a method for generating content-control information in accordance with an embodiment. During operation, the system determines one or more content attributes associated with the digital content (operation 302), and determines one or more presentation conditions for a candidate content-presenting device (operation 304). For example, the content attributes can include: a file name; a file type; a presentation state; a media format; a content category; a content rating; a file-creation date; and a content-publication date; and/or any other media content attributes. Also, the presentation conditions can include: a user identifier; a group identifier; a time range; a date range; a location; a presentation-device identifier; a user-interface capability; and/or any other conditions for presenting certain digital content.

The system can then generate a presentation policy based on the content attributes and the presentation conditions (operation 306). The presentation policy can indicate conditions that can include the content attributes that the content-presenting device needs to be capable of supporting, and can indicate the presentation conditions for determining whether the content-presenting device is allowed to present the digital content.

The system then generates a location-independent structured name for the content-control information object (operation 308), and generates the content-control information object to include the presentation policy and so that the object is named using the location-independent structured name (operation 310).

Figure 4:
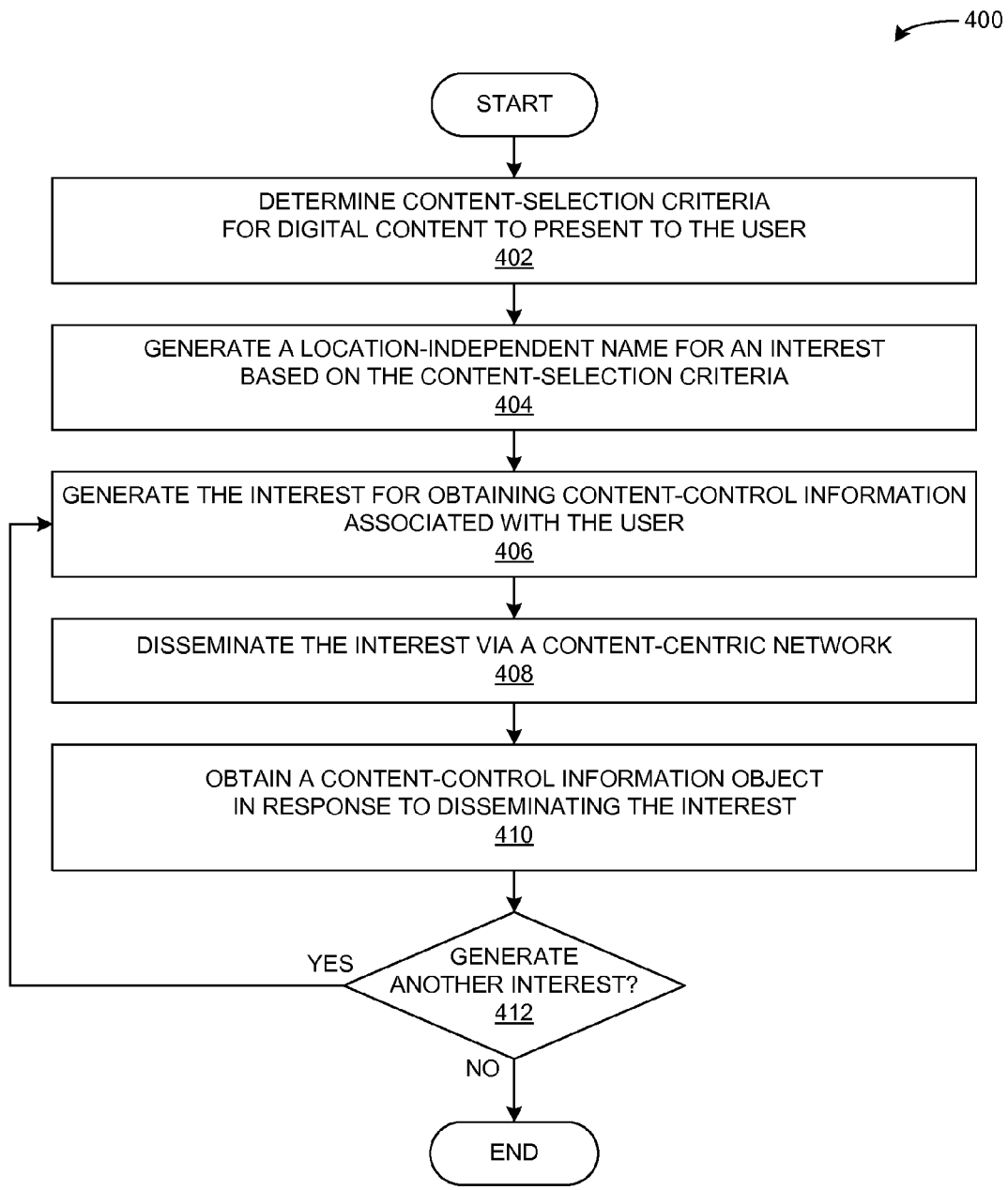
FIG. 4 presents a flow chart illustrating a method for obtaining content-control information associated with a user in accordance with an embodiment.

FIG. 4 presents a flow chart illustrating a method for obtaining content-control information objects associated with a user in accordance with an embodiment. During operation, the system determines content-selection criteria for digital content to present to the user (operation 402). The content-selection criteria can include any criteria that can be used to generate a CCN interest for content-control information objects that correspond to digital content that the user may be interested in experiencing. For example, the content-selection criteria can include: a CCN domain or subdomain; a user identifier; a group identifier; a content category; a content rating; and/or any other information that identifies the user or certain desired digital content.

The system uses the content-selection criteria to generate a location-independent structured name for an interest (operation 404), and generates the interest using the structured name to obtain a content-control information object associated with the user (operation 406). The system can disseminate the interest via a content-centric network (operation 408), and obtains one or more content-control information objects in response to disseminating the interest (operation 410).

In some embodiments, the system receives a content-control information object for each interest that it disseminates. The system can receive a plurality of content-control information objects by disseminating a plurality of interests. For example, the system can generate an interest to indicate content-selection criteria that excludes content-control information objects that the system has received in response to the interests that it has recently disseminated. The system then determines whether to generate another interest for digital content (operation 412). If so, the system returns to operation 406 to generate and disseminate another interest to receive additional content-control information objects. Otherwise, the system does not generate or disseminate other interests for the location-independent name.

Figure 5:
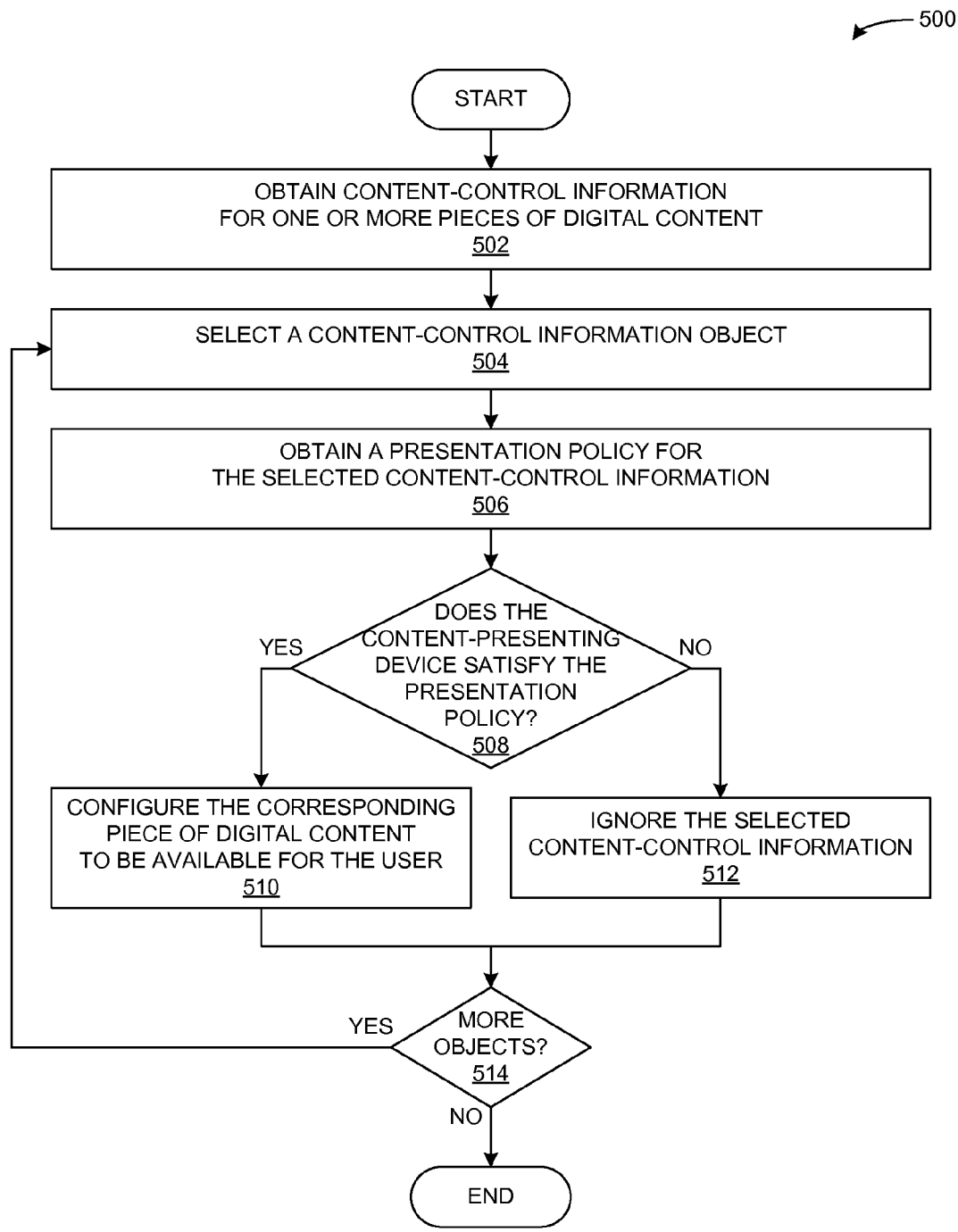
FIG. 5 presents a flow chart illustrating a method for selecting digital content to present to a user based on their presentation policies in accordance with an embodiment.

FIG. 5 presents a flow chart illustrating a method for selecting digital content to present to a user based on their presentation policies in accordance with an embodiment. During operation, the system obtains content-control information objects for one or more pieces of digital content (operation 502). Some of these content-control information objects can be associated with different presentation policies, such that not all of these policies may be satisfied by conditions associated with the local user and/or the local content-presenting device. Thus, the system needs to process their policies with the local conditions to determine which content-control information objects can be used to present content to the local user.

The system can select a respective content-control information object (operation 504), and obtains a presentation policy for the content-control information object (operation 506). The system then determines whether the content-presenting device satisfies the presentation policy (operation 508). If so, the system can proceed to configure the corresponding piece of digital content to be available to the user (operation 510). For example, the system can include this piece of digital content in a listing of content that the user can navigate through to select content. However, if the local content-presenting device does not satisfy the presentation policy, the system can ignore the corresponding content-control information object (operation 512).

The system then determines whether there are more content-control information objects to consider (operation 514). If so, the system can return to operation 504 to select another content-control information object.

Figure 6:
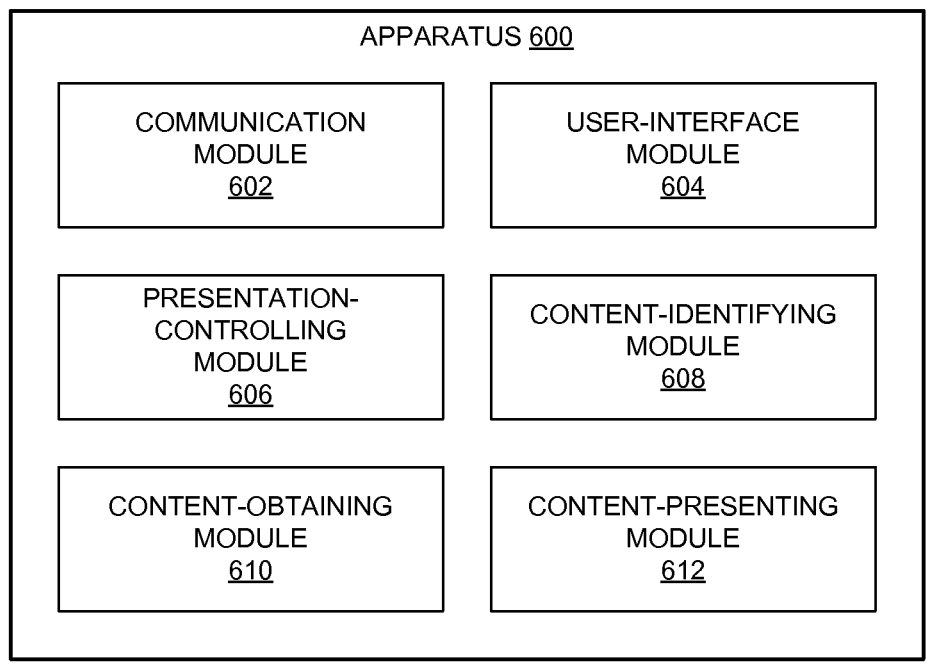
FIG. 6 illustrates an exemplary apparatus that facilitates accessing digital content associated with a user in accordance with an embodiment.

FIG. 6 illustrates an exemplary apparatus 600 that facilitates accessing digital content associated with a user in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, a user-interface module 604, a presentation-controlling module 606, a content-identifying module 608, a content-obtaining module 610, and a content-presenting module 612.

In some embodiments, communication module 602 can send and/or receive interests for digital content or content-control information objects, and can send and/or receive the digital content and/or content-control information objects that satisfy an interest. User-interface module 604 can present a listing of digital content associated with a local user, and can allow the user to select a piece of digital content for presentation.

Presentation-controlling module 606 that can determine when a user desires to experience digital content, and can detect a presentation-controlling event that alters the presentation of certain digital content, and can generate a content-control information object for the digital content. Content-identifying module 608 can obtain a content-control information object for a piece of digital content associated with the user. Content-obtaining module 610 can obtain the piece of digital content based on a location-independent structured name indicated by the content-control information object. Content-presenting module 612 can present the digital content to the local user based on a presentation state indicated by the content-control information object.

Figure 7:
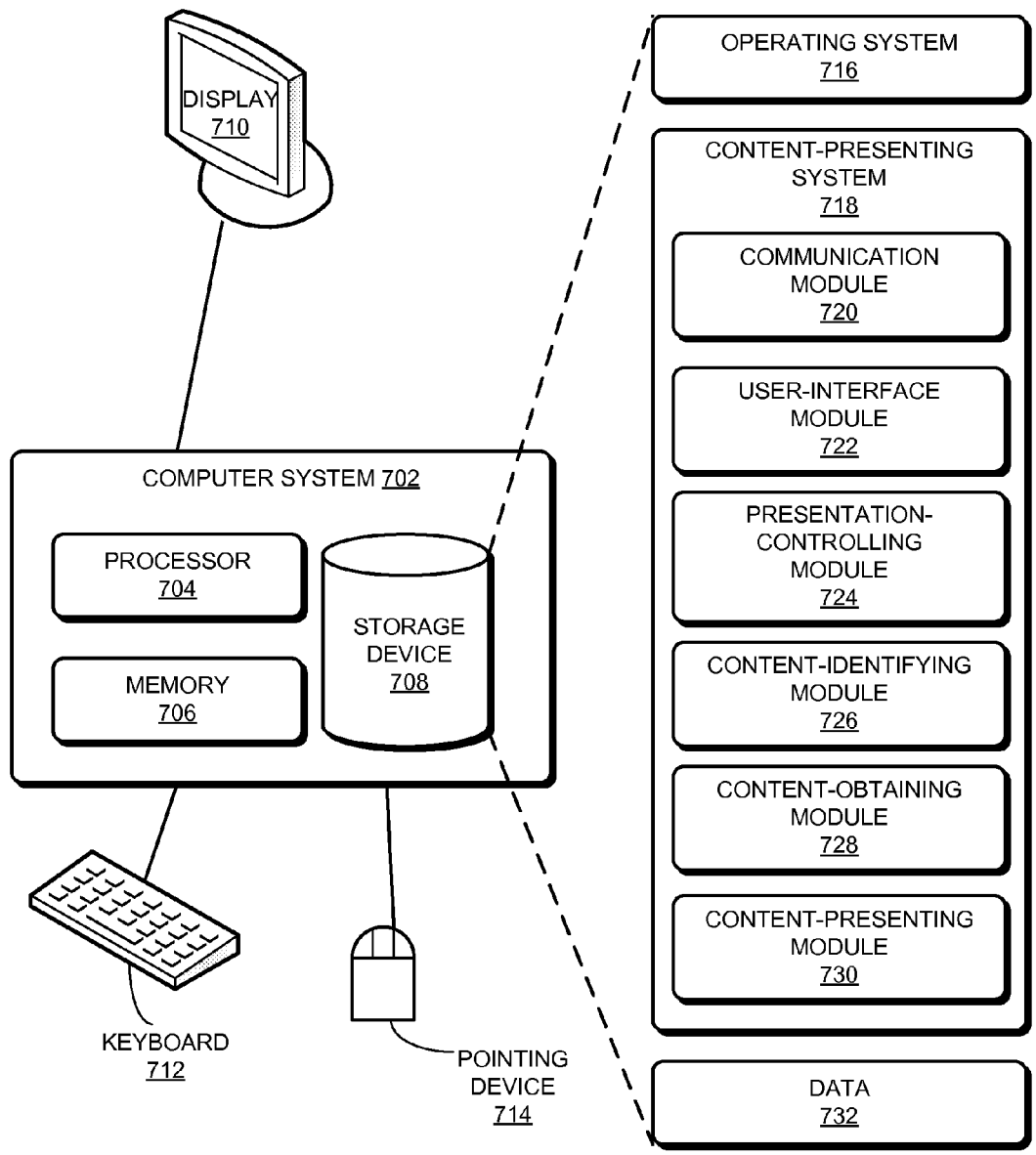
FIG. 7 illustrates an exemplary computer system that facilitates accessing digital content associated with a user in accordance with an embodiment.

FIG. 7 illustrates an exemplary computer system 702 that facilitates accessing digital content associated with a user in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, content-presenting system 718, and data 732.

Content-presenting system 718 can include instructions, which when executed by computer system 702, can cause computer system 702 to perform methods and/or processes described in this disclosure. Specifically, content-presenting system 718 may include instructions for sending and/or receiving interests for digital content or content-control information objects, and for sending and/or receiving the digital content and/or content-control information objects that satisfy an interest (communication module 720). Further, content-presenting system 718 can include instructions for presenting a listing of digital content associated with a local user, and allowing the user to select a piece of digital content for presentation (user-interface module 722).

Content-presenting system 718 can include instructions for determining when a user desires to experience digital content, detecting a presentation-controlling event that alters the presentation of certain digital content, and generating a content-control information object for the digital content (presentation-controlling module 724). Content-presenting system 718 can also include instructions for obtaining a content-control information object for a piece of digital content associated with the user (content-identifying module 726). Content-presenting system 718 can include instructions for obtaining the piece of digital content based on a location-independent structured name indicated by the content-control information object (content-obtaining module 728). Content-presenting system 718 can also include instructions for presenting the digital content to the local user based on a presentation state indicated by the content-control information object (content-presenting module 730).

Data 732 can include any data that is required as input or that is generated as output by the methods and/or processes described in this disclosure. Specifically, data 732 can store at least digital content for a user, presentation-state information for the digital content, and presentation-control objects that each indicates a presentation state for the digital content.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    presenting, by a content-presenting device, digital content for a local user;
    detecting a presentation-controlling event, which alters the presentation of the digital content at the content-presenting device;
    generating content-control information for the digital content, wherein the content-control information includes a location-independent structured name associated with the digital content, a user-provided command to pause or stop presentation of the digital content, and a presentation state resulting from executing the user-provided command for the digital content; and
    responsive to receiving an interest whose location-independent structured name is associated with the digital content, returning over a content-centric network the generated content-control information including the user-provided command to pause or stop presentation of the digital content to satisfy the interest.

2. The method of claim 1, wherein detecting the presentation-controlling event involves one or more of:
    detecting that the local user has paused the presentation of the digital content;
    detecting that the local user has stopped the presentation of the digital content;
    determining that the local user has left a proximity of the content-presenting device;
    determining that the user has initiated a presentation of a different piece of digital content at the content-presenting device; and
    determining that the user has initiated a presentation of a different piece of digital content at a different content-presenting device.

3. The method of claim 1, wherein generating the content-control information involves:
    determining one or more content attributes associated with the digital content;
    determining one or more presentation conditions for a remote content-presenting device;
    generating a presentation policy for the digital content based on the content attributes and the presentation conditions, wherein the presentation policy indicates one or more conditions for presenting the digital content at a target content-presenting device;
    generating the content-control information to include the presentation policy and
    generating a location-independent structured name for the content-control information based on the content attributes.

4. The method of claim 3, wherein the presentation policy includes one or more conditions associated with the content attributes and the presentation conditions.

5. The method of claim 3, wherein the content attributes include one or more of:
    a file name;
    a file type;
    a presentation state;
    a media format;
    a content category;
    a content rating;
    a file-creation date; and
    a content-publication date.

6. The method of claim 3, wherein the presentation conditions include one or more of:
    a user identifier;
    a group identifier;
    a time range;
    a date range;
    a location;
    a presentation-device identifier; and
    a user-interface capability.

7. A non-transitory computer-readable storage medium storing instructions that when executed by a computer cause the computer to perform a method, the method comprising:
    presenting, by a content-presenting device, digital content for a local user;
    detecting a presentation-controlling event, which alters the presentation of the digital content at the content-presenting device;
    generating content-control information for the digital content, wherein the content-control information includes a location-independent structured name associated with the digital content, a user-provided command to pause or stop presentation of the digital content, and a presentation state resulting from executing the user-provided command for the digital content; and
    responsive to receiving an interest whose location-independent structured name is associated with the digital content, returning over a content-centric network the generated content-control information including the user-provided command to pause or stop presentation of the digital content to satisfy the interest.

8. The storage medium of claim 7, wherein detecting the presentation-controlling event involves one or more of:

detecting that the local user has paused the presentation of the digital content;

detecting that the local user has stopped the presentation of the digital content;

determining that the local user has left a proximity of the content-presenting device;

determining that the user has initiated a presentation of a different piece of digital content at the content-presenting device; and determining that the user has initiated a presentation of a different piece of digital content at a different content-presenting device.

9. The storage medium of claim 7, wherein generating the content-control information involves:

determining one or more content attributes associated with the digital content;

determining one or more conditions for a remote content-presenting device;

generating a presentation policy for the digital content based on the determined content attributes and the determined conditions;

generating the content-control information to include the presentation policy and generating a location-independent structured name for the content-control information based on the content attributes.

10. A computer-implemented method, comprising:

determining, by a content-presenting device, that a local user desires to experience digital content;

obtaining content-control information for a piece of digital content, wherein the content-control information includes a location-independent structured name associated with the piece of digital content, a user-provided command to pause or stop presentation of the piece of digital content, and a presentation state resulting from executing the user-provided command for the piece of digital content, and wherein obtaining the content-control information involves:

generating one or more interests for content-control information, wherein a respective interest indicates a location-independent structured name associated with one or more pieces of digital content associated with the local user;

disseminating the one or more interests via a content-centric network; and responsive to disseminating the one or more interests, obtaining over the content-centric network one or more content-control information objects, wherein a respective content-control information object indicates at least a location-independent structured name for a corresponding piece of digital content, a user-provided command to pause or stop presentation of the corresponding piece of digital content, and a presentation state resulting from executing the user-provided command for the corresponding piece of digital content;

obtaining the digital content based on the location-independent structured name; and presenting the digital content to the local user based on the presentation state.

11. The method of claim 10, wherein determining that the local user desires to experience digital content involves one or more of:

determining that the local user has entered a proximity of the content-presenting device;

determining that the local user has activated a content-presenting capability of the content-presenting device;

determining that the local user has terminated a presentation of digital content; and determining that the local user has selected the piece of digital content for presentation.

12. The method of claim 10, wherein generating the interest involves:

determining content-selection criteria for digital content to present at the content-presenting device; and generating a location-independent structured name for the interest based on the content-selection criteria.

13. The method of claim 10, wherein obtaining the content-control information further involves:

determining a presentation policy for a respective content-control information object, wherein the presentation policy indicates one or more conditions for presenting a piece of digital content associated with the respective content-control information object;

determining whether the presentation policy is satisfied at the content-presenting device; and responsive to determining that the content-presenting device satisfies the presentation policy, configuring the piece of digital content to be available to the local user.

14. The method of claim 13, wherein the presentation policy includes one or more of the following conditions:

a user identifier;
a group identifier;
a content category;
a content rating;
a file type;
a media format;
a time range;
a date range;
a location;
a presentation-device identifier; and
a user-interface capability.

15. The method of claim 10, further comprising:

receiving content control information for one or more pieces of digital content to present to the user;

presenting to the local user a content listing that indicates the one or more pieces of digital content; and responsive to receiving a selection for a piece of digital content, presenting the piece of digital content based on a presentation state from the content-control information.

16. The method of claim 10, wherein obtaining the digital content involves:

generating one or more interests for the digital content, wherein a respective interest indicates the location-independent structured name associated with the digital content;

disseminating the one or more interests via a content-centric network; and responsive to disseminating the one or more interests, obtaining one or more pieces of digital content to present to the local user.

17. An apparatus comprising:

one or more processors;
a memory;
a presentation-triggering module to determine that a local user desires to experience digital content;
a content-identifying module to obtain and store in the memory content-control information for a piece of digital content, wherein the content-control information includes a location-independent structured name associated with the piece of digital content, a user-provided command to pause or stop presentation of the piece of digital content, and a presentation state resulting from executing the user-provided command for the piece of digital content, and wherein while obtaining the content-control information, the content-identifying module is further configured to:

generate one or more interests for content-control information, wherein a respective interest indicates a location-independent structured name associated with one or more pieces of digital content associated with the local user;

disseminate the one or more interests via a content-centric network; and responsive to disseminating the one or more interests, obtaining over the content-centric network one or more content-control information objects, wherein a respective content-control information object indicates at least a location-independent structured name for a corresponding piece of digital content, a user-provided command to pause or stop presentation of the corresponding piece of digital content, and a presentation state resulting from executing the user-provided command for the corresponding piece of digital content;

a content-obtaining module to obtain and store in the memory the digital content based on the location-independent structured name; and a content-presenting module to present the digital content stored in the memory to the local user based on the presentation state.

18. The apparatus of claim 17, wherein the presentation-triggering module determines that the local user desires to experience digital content in response to one or more of:

determining that the local user has entered a proximity of the content-presenting device;

determining that the local user has activated a content-presenting capability of the content-presenting device;

determining that the local user has terminated a presentation of digital content; and determining that the local user has selected the piece of digital content for presentation.

19. The apparatus of claim 17, wherein while generating the interest, the content-identifying module is further configured to:

determine content-selection criteria for digital content to present at the content-presenting device; and generate a location-independent structured name for the interest based on the content-selection criteria.

20. The apparatus of claim 19, wherein while obtaining the content-control information, the content-obtaining module is further configured to:

determine a presentation policy for a respective content-control information object, wherein the presentation policy indicates one or more conditions for presenting a piece of digital content associated with the respective content-control information object;

determine whether the presentation policy is satisfied at the content-presenting device; and configure the piece of digital content to be available to the local user responsive to determining that the content-presenting device satisfies the presentation policy.

21. The apparatus of claim 17, wherein the content-presenting module is further configured to:

receive content-control information for one or more pieces of digital content to present to the user;

present to the local user a content listing that indicates the one or more pieces of digital content; and responsive to receiving a selection for a piece of digital content, present the piece of digital content based on a presentation state from the content-control information.

22. The apparatus of claim 17, wherein while obtaining the digital content, the content-obtaining module is further configured to:

generate one or more interests for the digital content, wherein a respective interest indicates the location-independent structured name associated with the digital content;

disseminate the one or more interests via a content-centric network; and responsive to disseminating the one or more interests, obtain one or more pieces of digital content to present to the local user.

* * * * *